(12) United States Patent
Wu et al.

(10) Patent No.: US 11,243,635 B2
(45) Date of Patent: Feb. 8, 2022

(54) METHOD FOR DRIVING TOUCH DISPLAY AND TOUCH DISPLAY SCREEN

(71) Applicant: SHENZHEN ROYOLE TECHNOLOGIES CO., LTD., Guangdong (CN)

(72) Inventors: Dongguang Wu, Guangdong (CN); Xiaoping Tan, Guangdong (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/980,733

(22) PCT Filed: Mar. 23, 2018

(86) PCT No.: PCT/CN2018/080250
§ 371 (c)(1),
(2) Date: Sep. 14, 2020

(87) PCT Pub. No.: WO2019/178847
PCT Pub. Date: Sep. 26, 2019

(65) Prior Publication Data
US 2021/0011603 A1    Jan. 14, 2021

(51) Int. Cl.
*G06F 3/041* (2006.01)

(52) U.S. Cl.
CPC ...... *G06F 3/04166* (2019.05); *G06F 3/04164* (2019.05); *G06F 2203/04103* (2013.01)

(58) Field of Classification Search
CPC ............. G06F 3/04166; G06F 3/04164; G06F 2203/04103

(Continued)

(56) References Cited

U.S. PATENT DOCUMENTS 10,365,755 B2 *  7/2019  Uchiyama ........... G06F 3/04164
10,627,934 B2 *  4/2020  Ding ................... H01L 27/1255
(Continued)

FOREIGN PATENT DOCUMENTS

CN      104503610 A    4/2015
CN      105739763 A    7/2016
CN      106775162 A    5/2017

OTHER PUBLICATIONS

International Search Report issued in corresponding International Application No. PCT/CN2018/080250, dated Dec. 17, 2018, State Intellectual Property Office of the P.R. China, Beijing, China.

*Primary Examiner* — Tom V Sheng
(74) *Attorney, Agent, or Firm* — Hauptman Ham, LLP

(57) ABSTRACT

A method for driving touch display and a touch display screen are provided. The touch display screen includes a plurality of continuous work time periods. Each work time period includes a display time period and a touch time period. In the display time period, a plurality of second signal lines are configured to cooperate with a plurality of third signal lines to perform image-signal transmission for image display. The touch time period includes a detection time period and a sensing time period. In the detection time period, at least one second signal line of the plurality of the second signal lines is provided with a touch driving signal, a detection signal is received from a plurality of first signal lines, the detection signal is compared with a preset signal to obtain a comparison result, the touch time period is prolonged or shortened according to the comparison result.

16 Claims, 3 Drawing Sheets

(58) Field of Classification Search
USPC ........................................................ 345/173
See application file for complete search history.

(56) References Cited

U.S. PATENT DOCUMENTS

| | | | |
|---|---|---|---|
| 10,739,884 B2* | 8/2020 | Ota .................... | G09G 3/3648 |
| 10,884,554 B2* | 1/2021 | Katsuta ................ | G06F 3/0416 |
| 2009/0102809 A1* | 4/2009 | Mamba ............... | G06F 3/04883 |
| | | | 345/173 |
| 2011/0267295 A1* | 11/2011 | Noguchi .................. | G09G 5/18 |
| | | | 345/173 |
| 2012/0098776 A1* | 4/2012 | Chen ................... | G06F 3/04166 |
| | | | 345/173 |
| 2014/0104228 A1* | 4/2014 | Chen .................... | G06F 3/0412 |
| | | | 345/174 |
| 2014/0204041 A1* | 7/2014 | Munechika ........... | G06F 3/0412 |
| | | | 345/173 |
| 2015/0331518 A1* | 11/2015 | Kaneko ................ | G06F 3/0445 |
| | | | 345/174 |
| 2016/0147339 A1* | 5/2016 | Teranishi ............ | G06F 3/04184 |
| | | | 345/174 |
| 2016/0299587 A1* | 10/2016 | Huang .................... | G06F 3/041 |
| 2017/0269747 A1* | 9/2017 | Hu ...................... | G06F 3/04166 |
| 2018/0074642 A1* | 3/2018 | Lv ........................ | G06F 3/0443 |

* cited by examiner

METHOD FOR DRIVING TOUCH DISPLAY AND TOUCH DISPLAY SCREEN

RELATED APPLICATION

The present application is a U.S. National Phase of International Application Number PCT/CN2018/080250, filed Mar. 23, 2018.

TECHNICAL FIELD

This disclosure relates to the field of display technology, and particularly to a method for driving touch display and a touch display screen.

BACKGROUND

With the rapid development of display technology, touch display screens have become a part of people's daily life. The existing touch display screen mainly adopts a time-sharing driving manner to realize a touch function and a display function of the touch display screen.

At present, a touch driving circuit and a touch sensing circuit in a touch display screen are usually disposed on one side of a touch panel. Distances from touch driving electrodes in the touch panel to the touch driving circuit and distances from touch sensing electrodes to the touch sensing circuit are different. That is, in the touch display screen, there may be a touch electrode relatively far away the touch driving circuit and a touch electrode relatively close to the touch driving circuit. Due to resistance-capacitance delay of touch lines for transmitting a touch signal, duration required to scan a touch driving electrode row relatively far from the touch driving circuit will be the longest. In order to ensure that the touch driving electrode row relatively far from the touch driving circuit can be scanned normally, duration of each touch time period is usually uniformly set as the duration required to scan the touch driving electrode row relatively far from the touch driving circuit, which leads to relatively poor flexibility.

SUMMARY

In view of the above deficiencies, implementations of the disclosure provide a method for driving touch display and a touch display screen, which can adjust duration of a touch time period of the touch display screen and duration of a display time period of the touch display screen, thereby improving flexibility of time-sharing touch display in the touch display screen, and satisfying demand for improving touch precision or display effect can be achieved.

In a first aspect of the disclosure, a method for driving touch display is provided. The method is applicable to a touch display screen. The touch display screen includes a plurality of first signal lines, a plurality of second signal lines, and a plurality of third signal lines. The touch display screen performs image display and touch operation in a plurality of continuous work time periods. Each of the work time periods includes a display time period and a touch time period which are not overlapped. In any of the work time periods, the method includes the following. In the display time period, the plurality of second signal lines are driven to cooperate with the plurality of third signal lines to transmit an image signal for image display. In the touch time period, the plurality of first signal lines are driven to cooperate with at least one second signal line of the plurality of second signal lines to form a touch sensing unit for touch sensing, where the touch time period includes a detection time period and a sensing time period. In the detection time period, a touch driving signal is provided to the at least one second signal line of the plurality of second signal lines, a detection signal is received from the plurality of first signal lines, a comparison result is obtained by comparing the detection signal with a preset signal, and the touch time period is prolonged or shortened according to the comparison result. In the sensing time period, the touch driving signal is provided to the at least one second signal line of the plurality of second signal lines, a sensing signal is received from the plurality of first signal lines, and a touch operation is recognized by analyzing the sensing signal.

In a second aspect of the disclosure, a touch display screen is provided. The touch display screen includes a plurality of first signal lines, a plurality of second signal lines, and a plurality of third signal lines. The touch display screen performs image display and touch operation in a plurality of continuous work time periods. Each of the work time periods includes a display time period and a touch time period which are not overlapped. The touch display screen includes a display circuit and a touch circuit. In any of the work time periods: in the display time period, the display circuit is configured to provide a scan driving signal to the plurality of second signal lines and provide an image signal to the plurality of third signal lines, so that the plurality of second signal lines cooperate with the third signal lines to transmit the image signal for image display; in the touch time period, the touch circuit screen is configured to provide a touch driving signal to at least one second signal line of the plurality of second signal lines, so that the plurality of first signal lines cooperate with the at least one second signal line of the plurality of second signal lines to form a touch sensing unit for touch sensing, where the touch time period includes a detection time period and a sensing time period; in the detection time period, the touch circuit is configured to provide the touch driving signal to the at least one second signal line of the plurality of second signal lines, receive a detection signal from the plurality of first signal lines, obtain a comparison result by comparing the detection signal with a preset signal, and prolong or shorten the touch time period according to the comparison result; in the sensing time period, the touch circuit is configured to provide the touch driving signal to the at least one second signal line of the plurality of second signal lines, receive a sensing signal from the plurality of first signal lines, and recognize a touch operation by analyzing the sensing signal.

According to implementations of the disclosure, the touch display screen can perform image display and touch sensing in a time-sharing manner in each work time period (including the display time period and the touch time period). In the detection time period of the touch time period, the detection signal is compared with the preset signal to obtain the comparison result. Adjustment of duration of the touch time period and duration of the display time period can be realized according to the comparison result. In this way, flexibility of time-sharing touch display can be improved and demand for improving display effect or touch precision of the touch display screen can be satisfied.

BRIEF DESCRIPTION OF THE DRAWINGS

In order to describe technical solutions of implementations of the disclosure or the related art more clearly, the following will give a brief description of accompanying drawings used for describing the implementations. Apparently, accompanying drawings described below are merely some implementations. Those of ordinary skill in the art can also obtain other accompanying drawings based on the accompanying drawings described below without creative efforts.

DETAILED DESCRIPTION

Hereinafter, technical solutions embodied by implementations of the disclosure will be described in a clear and comprehensive manner with reference to the accompanying drawings intended for the implementations. It is evident that the implementations described herein constitute merely some rather than all of the implementations of the disclosure, and that those of ordinary skill in the art will be able to derive other implementations based on these implementations without making creative efforts, which all such derived implementations shall all fall in the protection scope of the disclosure.

According to implementations of the disclosure, a method for driving touch display is provided. The method is applicable to a touch display screen. According to the method, during a display time period, an image is displayed. During a detection time period in a touch time period, a detection signal is compared with a preset signal, and the touch time period is prolonged if a comparison result is beyond a first range. As such, flexibility of time-sharing display touch can be improved, and demand for improving display effect or touch precision can be satisfied.

Figure 1:
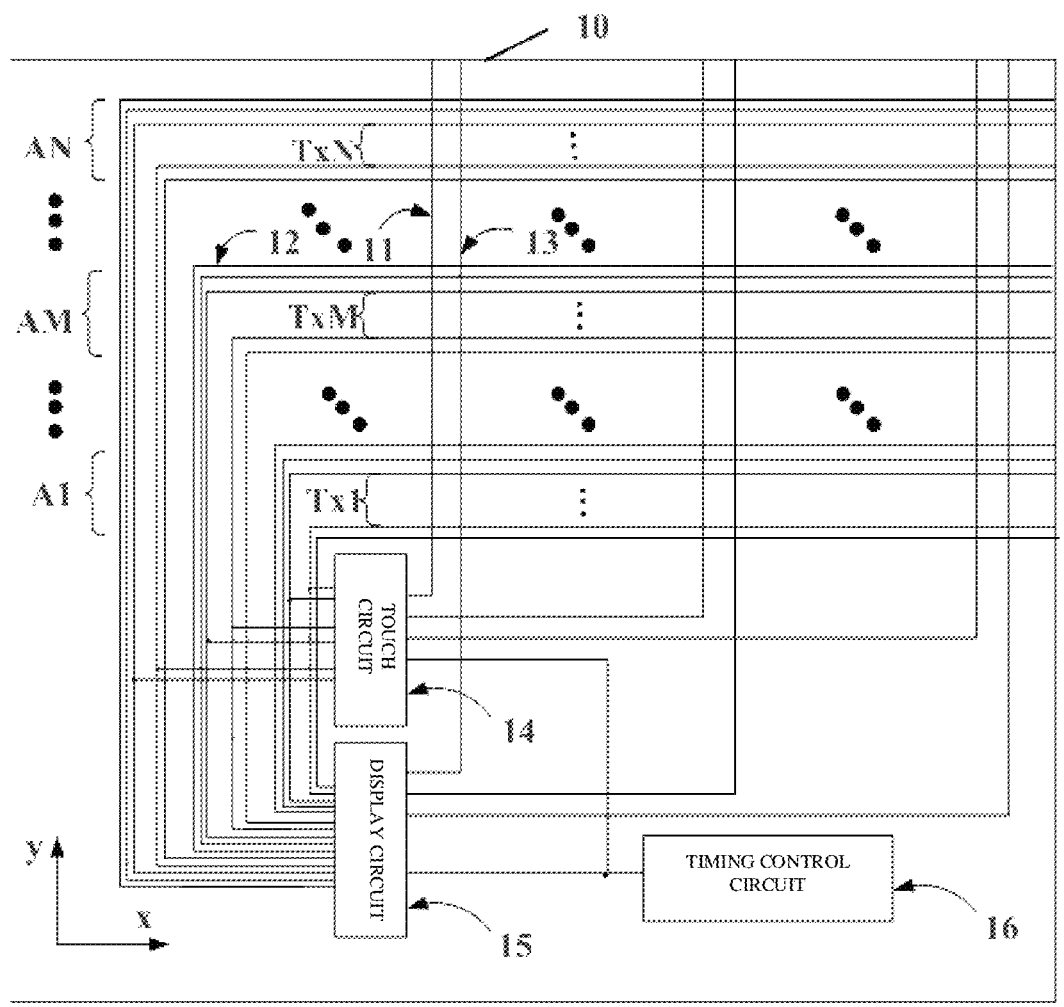
FIG. 1 is a schematic diagram illustrating a planar structure of a touch display screen according to implementations.

FIG. 1 is a schematic diagram illustrating a planar structure of a touch display screen 10 according to implementations. In one implementation, as illustrated in FIG. 1, the touch display screen 10 includes a plurality of scan areas A1~AM~AN which are extended along a first direction x and arranged along a second direction y, where N>M>1, N and M are integers, and the first direction x is perpendicular to the second direction y. Each scan area Ai includes a plurality of second signal lines 12 which are extended along the first direction x and arranged along the second direction y, where 1≤i≤N.

Each scan area Ai includes one scan channel Txi. The scan channel Txi includes at least one second signal line 12 among the plurality of second signal lines 12. In one implementation, in all the scan channels Txi, the amount of the second signal line(s) 12 and the position of the second signal line(s) 12 in the scan channel Txi are the same.

The touch display screen 10 further includes a plurality of first signal lines 11 and a plurality of third signal lines 13. The plurality of first signal lines 11 and the plurality of third signal lines 13 are extended along the second direction y and arranged along the first direction x. The first signal line 11 is insulated from the third signal line 13. In this implementation, the touch display screen 10 further includes a touch circuit 14, a display circuit 15, and a timing control circuit 16.

The display circuit 15 is electrically coupled with a plurality of second signal lines 12 and a plurality of third signal lines 13 respectively. The display circuit 15 is configured to drive the plurality of second signal lines 12 to cooperate with the plurality of third signal lines 13 to perform image-signal transmission for image display. The touch circuit 14 is electrically coupled with at least one second signal line 12 of the plurality of second signal lines 12 and a plurality of first signal lines 11 respectively. The touch circuit 14 is configured to drive the at least one second signal line 12 to cooperate with the plurality of first signal lines 11 to form a touch sensing unit (not illustrated in FIG. 1), so that the touch display screen 10 can perform touch sensing. The timing control circuit 16 is electrically coupled to the touch circuit 14 and the display circuit 15 respectively, to control work duration of the touch circuit 14 and the display circuit 15 and control the touch circuit 14 and the display circuit 15 for time-sharing work, which can realize time-sharing image display and touch sensing of the touch display screen 10. It should be noted that, the touch sensing can at least identify a position of a touch operation applied on the touch display screen. The touch sensing can also identify a force applied by the touch operation and time when the touch operation is applied.

In one implementation, the timing control circuit 16 is configured to control the touch circuit 14 and the display circuit 15 to work in a time-sharing manner. The timing control circuit 16 is configured to control the touch circuit 14 and the display circuit 15 to perform image display and touch operations during multiple continuous work time periods, where each work time period includes a display time period and a touch time period. In one implementation, the timing control circuit 16 is further configured to control the display circuit 15 to perform image display during the display time period, and control the touch circuit 14 to perform touch sensing during the touch time period. In one implementation, the display time period is not overlapped with the touch time period.

In this implementation, the first signal line 11 is used as a touch sensing line, the second signal line 12 is used as a scan line and a touch driving line in a time-sharing manner, and the third signal line 13 is used as a data line. That is, the touch display screen 10 is configured to multiplex the second signal line 12 into a touch driving line when performing touch sensing and multiplex the second signal line 12 into a scan line when performing image display.

In a display time period of any work time period, the timing control circuit 16 is configured to output a first control signal to the display circuit 15, to control the display circuit 15 to output a scan driving signal via second signal lines 12 and an image signal via third signal lines 13, so that the touch display screen 10 is in a display state. In a touch time period of any work time period, the timing control circuit 16 is further configured to output a second control signal to the touch circuit 14, to control the touch circuit 14 to output a touch driving signal via a second signal line(s) 12 and to receive a touch sensing signal via first signal lines 11, so that the touch display screen 10 is in a touch sensing state.

In one implementation, during the display time period, the display circuit 15 is configured to load a scan driving signal to a plurality of second signal lines 12 and load an image signal to a plurality of third signal lines 13, so that the plurality of second signal lines 12 cooperate with the plurality of third signal lines 13 to transmit the image signal for image display. During the touch time period, the touch circuit 14 is configured to sequentially load a touch driving signal to at least one second signal line 12 of the plurality of second signal lines 12 after receiving the touch driving signal, and receive a touch sensing signal from a plurality of first signal lines 11.

In one implementation, the touch time period includes a detection time period and a sensing time period. In the detection time period, the touch circuit 14 is configured to provide the touch driving signal to the at least one second signal line 12 of the plurality of second signal lines 12, receive a detection signal from the plurality of first signal lines 11, obtain a comparison result by comparing the detection signal with a preset signal, and transmit the comparison result to the timing control circuit 16, whereby the timing control unit 16 is configured to prolong or shorten the touch time period according to the comparison result. In the sensing time period, the touch circuit 14 is configured to provide the touch driving signal to the at least one second signal line 12 of the plurality of second signal lines 12, receive a sensing signal from the plurality of first signal lines 11, and recognize a touch operation by analyzing the touch sensing signal.

Figure 2:
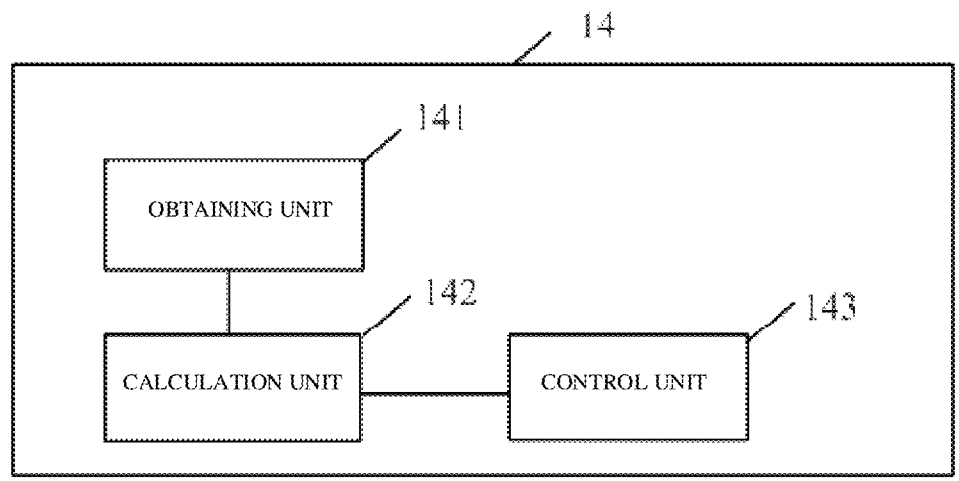
FIG. 2 is a schematic structural diagram illustrating a touch circuit illustrated in FIG. 1 according to implementations.

As illustrated in FIG. 2, the touch circuit 14 includes an obtaining unit 141, a calculation unit 142, and a control unit 143. The obtaining unit 141 is configured to obtain a voltage value of the detection signal and an average voltage value of the preset signal. The calculation unit 142 is configured to calculate a difference between the average voltage value of the preset signal and the voltage value of the detection signal. The control unit 143 is configured to use the difference as a comparison result and transmit the comparison result to the timing control circuit 16. As such, the timing control circuit 16 can adjust duration of the touch time period and the display time period according to the comparison result when the touch circuit 14 and the display circuit 15 operate.

Figure 3:
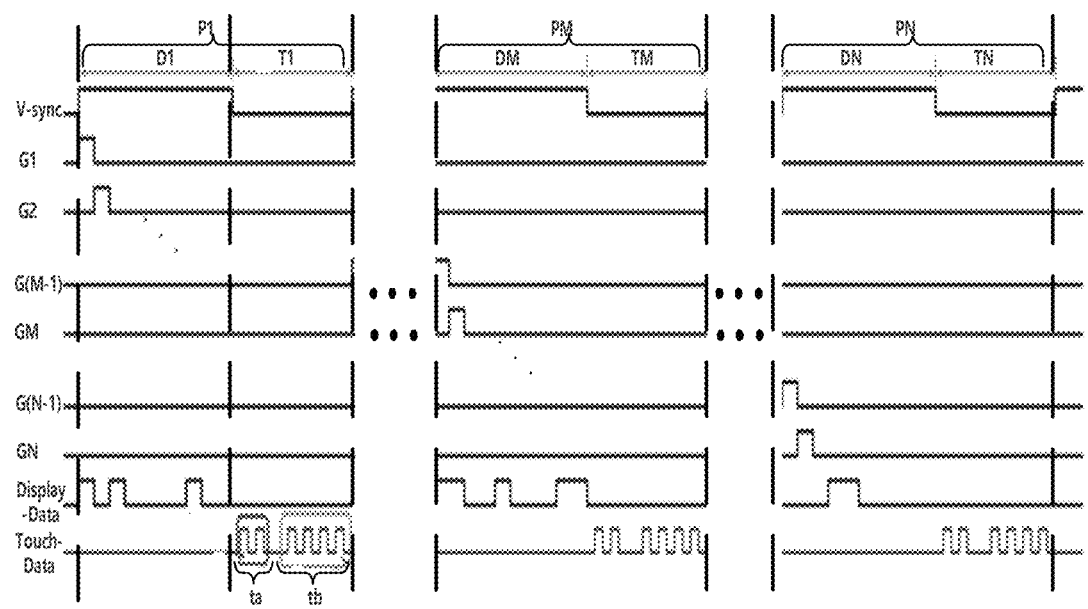
FIG. 3 is a schematic diagram illustrating a working time sequence based on the touch display screen illustrated in FIG. 1 according to implementations.
Figure 4:
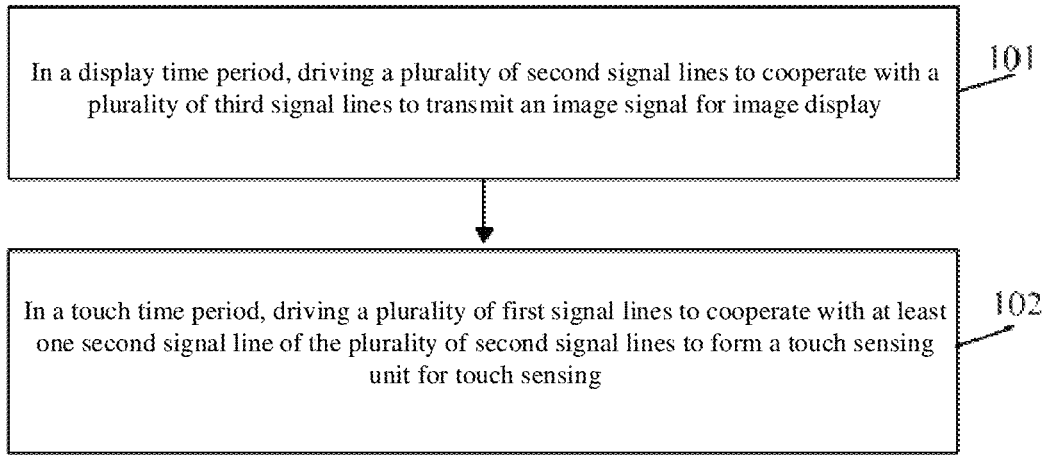
FIG. 4 is a schematic flowchart illustrating a method for driving touch display based on the touch display screen illustrated in FIG. 1 according to implementations.

Referring to FIG. 3 and FIG. 4, FIG. 3 is a working time sequence diagram illustrating a time period during which the touch display screen 10 illustrated in FIG. 1 displays a frame of an image, and FIG. 4 is a schematic flowchart illustrating a method for driving touch display based on the touch display screen 10 illustrated in FIG. 1.

The timing control circuit 16 is configured to output a vertical synchronization signal V-sync to divide a time period during which a frame of an image is displayed into N continuous work time periods P, such as P1, P2, . . . , PM, . . . , PN, where N>M>1, and N and M are integers. Each work time period P for image display and touch sensing corresponds to a scan area. For example, first work time period P1 corresponds to first scan area A1, second work time period P2 corresponds to second scan area A2, and the like, $M^{th}$ work time period PM corresponds to $M^{th}$ scan area AM, and $N^{th}$ work time period PN corresponds to $N^{th}$ scan area AN.

For each work time period P, the vertical synchronization signal V-sync is further used to control the display circuit 15 to work in display time period D and control the touch circuit 14 to work in touch time period T respectively. For example, work time period P1 includes touch time period T1 and display time period D1, work time period PM includes touch time period TM and display time period DM, and work time period PN includes touch time period TN and display time period DN. In display time period D, all second signal lines 12 in a scan area are loaded with a scan driving signal to cooperate with third signal lines 13 to perform image display. In touch time period T, a second signal line(s) 12 in a scan channel of the scan area is loaded with a touch driving signal to cooperate with a plurality of first signal lines 11 to perform touch sensing. That is, in each work time period P, the touch display screen 10 is controlled to be in a display state during display time period D, and the touch display screen 10 is controlled to be in a touch sensing state during touch time period T.

Further, each touch time period T includes detection time period ta and sensing time period tb that are continuous in time but not overlapped with each other. For example, touch time period T1 includes detection time period ta and sensing time period tb. In detection time period ta, the touch driving signal is provided to a touch sensing unit and a corresponding detection signal is received, the detection signal is compared with a preset signal to obtain a comparison result, and whether the detection signal has noise is determined based on the comparison result, so as to prolong or shorten the touch time period. In sensing time period tb, the touch driving signal is provided to the touch sensing unit and a sensing signal is received, and the sensing signal is analyzed to recognize a touch operation. In this implementation, prolonging or shortening the touch time period is embodied as prolonging or shortening sensing time period tb.

In one implementation, work operations of the touch display screen 10 will be described in detail by taking first work time period P1 of a time period during which a frame of an image is displayed as an example.

As illustrated in FIG. 4, a method for driving touch display includes the following.

At block 101, in display time period D, a plurality of second signal lines 12 in the touch display screen 10 are driven to cooperate with a plurality of third signal lines 13 in the touch display screen 10 to perform image-signal transmission for image display.

A timing control circuit 16 and a display circuit 15 are configured to execute the operations at block 101. Specifically, when the touch display screen 10 is in display time period D, the timing control circuit 16 is configured to transmit a first control signal of a vertical synchronization signal V-sync to the display circuit 15, and the display circuit 15 is configured to transmit a scan driving signal to the plurality of second signal lines 12 sequentially and transmit an image data to the plurality of third signal lines 13, so that the touch display screen 10 can perform image display.

At block 102, in touch time period T, a plurality of first signal lines 11 in the touch display screen 10 are driven to cooperate with at least one second signal line of the plurality of second signal lines 12 to form a touch sensing unit for touch sensing.

It should be noted that, when the touch display screen 10 is in touch time period T, the timing control circuit 16 is configured to transmit a second control signal of the vertical synchronization signal V-sync to the touch circuit 14, and the touch circuit 14 is configured to sequentially output a touch driving signal to a second signal line(s) 12 in scan channel Txi of a scan area, and the touch circuit 14 is configured to receive a touch sensing signal (i.e., touch data) from the plurality of first signal lines 11, so that the touch display screen 10 can perform touch sensing recognition. The touch sensing signal includes a detection signal and a sensing signal.

The touch display screen 10 for example scans scan area Ai during touch time period T. When the touch display screen 10 is in touch time period T, the timing control circuit 16 is configured to transmit a second control signal to the touch circuit 14, and the touch circuit 14 is configured to sequentially load a touch driving signal to a second signal line(s) 12 in scan channel Txi of scan area Ai. As such, the second signal line(s) 12 in scan channel Txi and the plurality of first signal lines 11 are driven to form a touch sensing unit, so that the touch display screen 10 can perform touch sensing.

Referring to FIG. 1, taking a scenario where the touch display screen 10 scans scan area A1 during touch time period T1 as an example, when the touch display screen 10 is in touch time period T1, the timing control circuit 16 is configured to transmit a second control signal to the touch circuit 14, and the touch circuit 14 is configured to sequentially load a touch driving signal to a second signal line 12 in scan channel Tx1 of scan area A1. As such, the second signal line 12 in scan channel Tx1 and a plurality of first signal lines 11 are driven to form a touch sensing unit, so that the touch display screen 10 can perform touch sensing.

Figure 5:
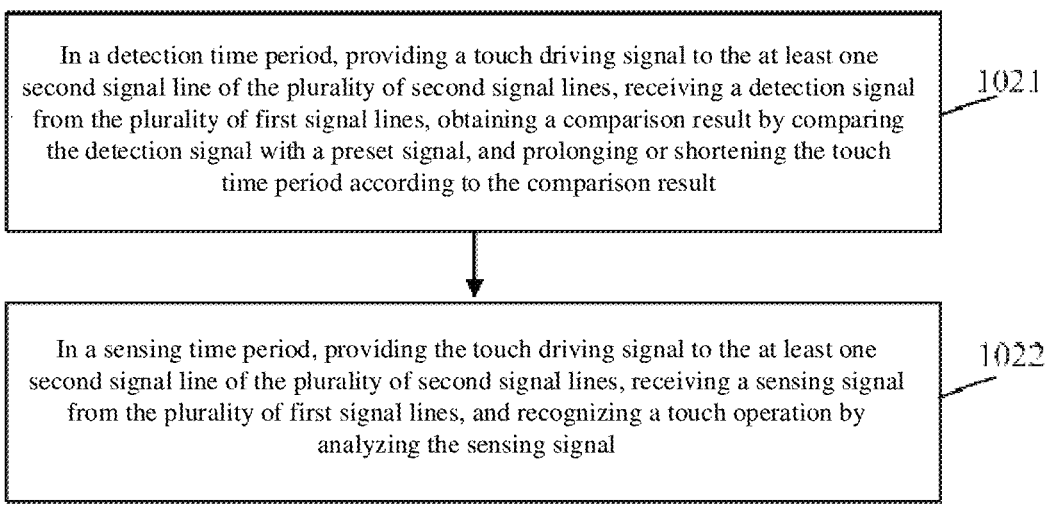
FIG. 5 is a specific schematic flowchart based on touch time periods illustrated in FIG. 4 according to implementations.

In one implementation, as illustrated in FIG. 5, the driving corresponding to the touch time period at block 102 further includes the following.

At block 1021, in detection time period ta, a touch driving signal is provided to the at least one second signal line 12 of the plurality of second signal lines 12, a detection signal is received from the plurality of first signal lines 11, a comparison result is obtained by comparing the detection signal with a preset signal, and the touch time period is prolonged or shortened according to the comparison result.

In one implementation, the touch display screen 10 is configured to control the timing control circuit 16 to transmit a second control signal to the touch circuit 14. In detection time period ta of touch time period T, the touch circuit 14 is configured to provide a touch driving signal to the at least one second signal line of the plurality of second signal lines 12, receive a detection signal from the plurality of first signal lines 11, obtain a comparison result by comparing the detection signal with a preset signal, and prolong or shorten the touch time period according to the comparison result. In this way, duration of the display time period is shortened or prolonged accordingly while duration of each work time period P remains unchanged. In sensing time period Tb in touch time period T, the touch circuit 14 is further configured to provide the touch driving signal to the at least one second signal line 12 of the plurality of second signal lines 12, and receive a sensing signal from the plurality of first signal lines 12, and recognize a touch operation by analyzing the sensing signal.

Referring to FIG. 1, taking a scenario where the touch circuit 14 scans a second signal line 12 in scan channel Tx1 of scan area A1 during touch time period T1 as an example, in detection time period ta of touch time period T1, the touch display screen 10 is configured to control the timing control circuit 16 to transmit a second control signal to the touch circuit 14, and the touch circuit 14 is configured to provide a touch driving signal to a second signal line 12 in scan channel Tx1, receive a detection signal from the plurality of first signal lines 11, obtain a comparison result by comparing the detection signal with a preset signal, and transmit the comparison result to the timing control circuit 16, so that the timing control circuit 16 can prolong or shorten sensing time period tb of touch time period T1 according to the comparison result. In sensing time period tb of touch time period T1, the touch circuit 14 is further configured to provide the touch driving signal to the second signal line 12 in scan channel Tx1 of scan area A1, receive a sensing signal from the plurality of first signal lines 12, and recognize a touch operation by analyzing the sensing signal.

In one implementation of the disclosure, the comparison result may be obtained by comparing a voltage value of the detection signal with an average voltage value of the preset signal, or obtained by comparing a waveform of the detection signal with a waveform of the preset signal. The comparison result can be used to represent whether noise exists in the detection signal.

In one implementation, an obtaining unit 141 is configured to obtain a voltage value of the detection signal and an average voltage value of the preset signal. A calculation unit 142 is configured to calculate a difference (value) between the average voltage value of the preset signal and a voltage value of the detection signal. A control unit 143 is configured to assign the difference as the comparison result and transmit the comparison result to the timing control circuit 16. As such, the timing control circuit 16 can adjust duration of the touch time period according to the comparison result.

The touch circuit 14 for example compares the waveform of the detection signal with the waveform of the preset signal. The comparison result is a similarity, and a first range is a value range of the similarity. In another implementation, the obtaining unit 141 is configured to obtain the waveform of the detection signal and the waveform of the preset signal. The calculation unit 142 is configured to calculate a similarity between the waveform of the preset signal and the waveform of the detection signal. The control unit 143 is configured to use the similarity as the comparison result and transmit comparison result to the timing control circuit 16, so that the timing control circuit 16 can adjust the duration of the touch time period according to the comparison result.

In this implementation, the detection signal is compared with the preset signal to represent whether noise exists in the detection signal, so as to realize adjustment of duration of touch time period T and display time period D of the touch display screen 10. In one implementation, if the comparison result is within the first range, indicate that noise does not exist in the detection signal. In this situation, the timing control circuit 16 is configured to shorten touch time period T by first duration and prolong display time period D by the first duration, which can reserve sufficient charging time for a pixel unit (not illustrated in FIG. 1) while ensuring touch precision of the touch display screen 10, thereby improving display effect of the touch display screen 10. If the comparison result exceeds the first range, indicate that noise exists in the detection signal. In this situation, touch time period T is prolonged by second duration and display time period D is shortened by the second duration. In this way, touch precision can be ensured.

The comparison result for example is a difference between an average voltage value of the touch driving signal and a voltage value of the detection signal. If the difference is less than ten percent of the voltage value of the touch driving signal (i.e., the comparison result falls into the first range), indicate that there is no noise in the detection signal. In this situation, the timing driving circuit 16 is configured to shorten touch time period T by first duration and prolong display time period D by the first duration. If the difference is greater than or equal to ten percent of the voltage value of the touch driving signal (i.e., the comparison result is beyond the first range), indicate that there is noise in the detection signal. In this situation, the timing driving circuit 16 is configured to prolong touch time period T by second duration and shorten display time period D by the second duration.

At block 1022, in sensing time period tb, the touch driving signal is provided to the at least one second signal line 12 of the plurality of second signal lines 12, a sensing signal is received from the plurality of first signal lines 11, and a touch operation is recognized by analyzing the sensing signal.

According to implementations of the disclosure, the touch display screen can perform image display and touch sensing in a time-sharing manner in each work time period. The touch display screen compares the detection signal with the preset signal during the detection time period of the touch time period to obtain the (comparison) result. Adjustment of the duration of the touch time period of the touch display screen and the duration of the display time period of the touch display screen can be realized according to the result. In this way, flexibility of time-sharing touch display of the touch display screen can be improved, and demand for improving touch precision or display effect of the touch display screen can be satisfied.

The touch display screen, the touch circuit, and the method for driving touch display provided by the implementations of the disclosure have been described in detail above. While the principles and implementations of the disclosure have been described in connection with illustrative implementations, it is to be understood that foregoing implementations are only used to help understand the method and core idea of the disclosure. As will occur to those skilled in the art, the disclosure is susceptible to various modifications and changes without departing from the spirit and principle of the disclosure. Therefore, the disclosure is not to be limited to the disclosed implementations.

What is claimed is:

1. A method for driving a touch display, applicable to a touch display screen, wherein the touch display screen comprises a plurality of first signal lines, a plurality of second signal lines, and a plurality of third signal lines; the touch display screen performs image display and touch operation in a plurality of continuous work time periods, each of the work time periods comprising a display time period and a touch time period which are not overlapped, wherein in any of the work time periods, the method comprises:
   in the display time period, driving the plurality of second signal lines to cooperate with the plurality of third signal lines to transmit an image signal for image display; and
   in the touch time period, driving the plurality of first signal lines to cooperate with at least one second signal line of the plurality of second signal lines for touch sensing;
   wherein the touch time period comprises a detection time period and a sensing time period, and in the touch time period, driving the plurality of first signal lines to cooperate with the at least one second signal line of the plurality of second signal lines for touch sensing comprises:
      in the detection time period, providing a touch driving signal to the at least one second signal line of the plurality of second signal lines, receiving a detection signal from the plurality of first signal lines, obtaining a comparison result by comparing the detection signal with a preset signal, and prolonging or shortening the touch time period according to the comparison result; and
      in the sensing time period, providing the touch driving signal to the at least one second signal line of the plurality of second signal lines, receiving a sensing signal from the plurality of first signal lines, and recognizing a touch operation by analyzing the sensing signal.

2. The method for driving the touch display of claim 1, wherein prolonging or shortening the touch time period according to the comparison result comprises:
   in accordance with a determination that the comparison result falls into a first range, determining that noise does not exist in the detection signal, shortening the sensing time period in the touch time period by first duration, and prolonging the display time period.

3. The method for driving the touch display of claim 1, wherein prolonging or shortening the touch time period according to the comparison result comprises:
   in accordance with a determination that the comparison result is beyond a first range, determining that noise exists in the detection signal, prolonging the sensing time period in the touch time period by second duration, and shortening the display time period.

4. The method for driving the touch display of claim 1, wherein obtaining the comparison result by comparing the detection signal with the preset signal comprises:
   obtaining a voltage value of the detection signal and an average voltage value of the preset signal;
   calculating a difference value between the average voltage value of the preset signal and the voltage value of the detection signal; and
   assigning the difference value as the comparison result.

5. The method for driving the touch display of claim 4, wherein the touch display screen comprises a plurality of scan areas which are extended along a first direction and arranged along a second direction, and the first direction is perpendicular to the second direction; each of the scan areas comprises a plurality of second signal lines which are extended along the first direction and arranged along the second direction; each of the scan areas comprises a scan channel; each scan channel comprises at least one second signal line of the plurality of second signal lines, and the amount and arrangement of second signal lines are the same in each scan channel; the plurality of first signal lines and the plurality of third signal lines are extended along the second direction and arranged along the first direction while insulated from one another, wherein each work time period corresponds to one scan area.

6. The method for driving touch display of claim 1, wherein obtaining the comparison result by comparing the detection signal with the preset signal comprises:
   obtaining a waveform of the detection signal and a waveform of the preset signal;
   calculating a similarity between the waveform of the preset signal and the waveform of the detection signal; and
   assigning the similarity as the comparison result.

7. The method for driving the touch display of claim 1, wherein prolonging or shortening the touch time period according to the comparison result comprises:
   in accordance with a determination that the comparison result falls into a first range, determining that noise does not exist in the detection signal, shortening the sensing time period in the touch time period by first duration, and prolonging the display time period by the first duration.

8. The method for driving the touch display of claim 7, wherein prolonging or shortening the touch time period according to the comparison result comprises:
   in accordance with a determination that the comparison result is beyond the first range, determining that noise exists in the detection signal, prolonging the sensing time period in the touch time period by second duration, and shortening the display time period by the second duration.

9. A touch display screen, comprising a plurality of first signal lines, a plurality of second signal lines, and a plurality of third signal lines; the touch display screen performs image display and touch operation in a plurality of continuous work time periods, each of the work time periods comprising a display time period and a touch time period which are not overlapped, wherein in any of the work time periods, in the display time period, a display circuit of the touch display screen is configured to provide a scan driving signal to the plurality of second signal lines and provide an image signal to the plurality of third signal lines, so that the plurality of second signal lines cooperate with the third signal lines to transmit the image signal for image display; and in the touch time period, a touch circuit of the touch display screen is configured to provide a touch driving signal to at least one second signal line of the plurality of second signal lines, so that the plurality of first signal lines cooperate with the at least one second signal line of the plurality of second signal lines for touch sensing;

wherein the touch time period comprises a detection time period and a sensing time period, and in the touch time period, the touch circuit configured to provide the touch driving signal to the at least one second signal line of the plurality of second signal lines, so that the plurality of first signal lines cooperate with the at least one second signal line of the plurality of second signal lines for touch sensing is configured to:

in the detection time period, the touch circuit is configured to provide the touch driving signal to the at least one second signal line of the plurality of second signal lines, receive a detection signal from the plurality of first signal lines, obtain a comparison result by comparing the detection signal with a preset signal, and prolong or shorten the touch time period according to the comparison result; and in the sensing time period, the touch circuit is configured to provide the touch driving signal to the at least one second signal line of the plurality of second signal lines, receive a sensing signal from the plurality of first signal lines, and recognize a touch operation by analyzing the sensing signal.

10. The touch display screen of claim 9, wherein the touch display screen further comprises a timing control circuit, and the timing control circuit is configured to control work duration of the display circuit and the touch circuit; wherein the timing control circuit is configured to determine that noise does not exist in the detection signal in accordance with a determination that the comparison result falls into a first range, control the sensing time period in the touch time period to shorten by first duration, and prolong the display time period.

11. The touch display screen of claim 10, wherein the timing control circuit is configured to determine that noise exists in the detection signal in accordance with a determination that the comparison result is beyond the first range, control the sensing time period in the touch time period to prolong by second duration, and shorten the display time period.

12. The touch display screen of claim 10, wherein the touch circuit includes an obtaining unit, a calculation unit, and a control unit, wherein the obtaining unit is configured to obtain a voltage value of the detection signal and an average voltage value of the preset signal;

the calculation unit is configured to calculate a difference value between the average voltage value of the preset signal and the voltage value of the detection signal; and the control unit is configured to assign the difference value as the comparison result and transmit the comparison result to the timing control circuit.

13. The touch display screen of claim 12, wherein the touch display screen comprises a plurality of scan areas which are extended along a first direction and arranged along a second direction, and the first direction is perpendicular to the second direction; each of the scan areas comprises a plurality of second signal lines which are extended along the first direction and arranged along the second direction; each of the scan areas comprises a scan channel; each scan channel comprises at least one second signal line of the plurality of second signal lines, and the amount and arrangement of second signal lines are the same in each scan channel; the plurality of first signal lines and the plurality of third signal lines are extended along the second direction and arranged along the first direction while insulated from one another, wherein each work time period corresponds to one scan area.

14. The touch display screen of claim 10, wherein the touch circuit includes an obtaining unit, a calculation unit, and a control unit, wherein the obtaining unit is configured to obtain a waveform of the detection signal and a waveform of the preset signal;

the calculation unit is configured to calculate a similarity between the waveform of the preset signal and the waveform of the detection signal; and the control unit is configured to assign the similarity as the comparison result and transmit the comparison result to the timing control circuit.

15. The touch display screen of claim 9, wherein the touch display screen further comprises a timing control circuit, and the timing control circuit is configured to control work duration of the display circuit and the touch circuit; wherein the timing control circuit is configured to determine that noise does not exist in the detection signal in accordance with a determination that the comparison result falls into a first range, control the sensing time period in the touch time period to shorten by first duration, and prolong the display time period by the first duration.

16. The touch display screen of claim 15, wherein the timing control circuit is configured to determine that noise exists in the detection signal in accordance with a determination that the comparison result is beyond the first range, control the sensing time period in the touch time period to prolong by second duration, and shorten the display time period by the second duration.

* * * * *